Patented Jan. 1, 1952

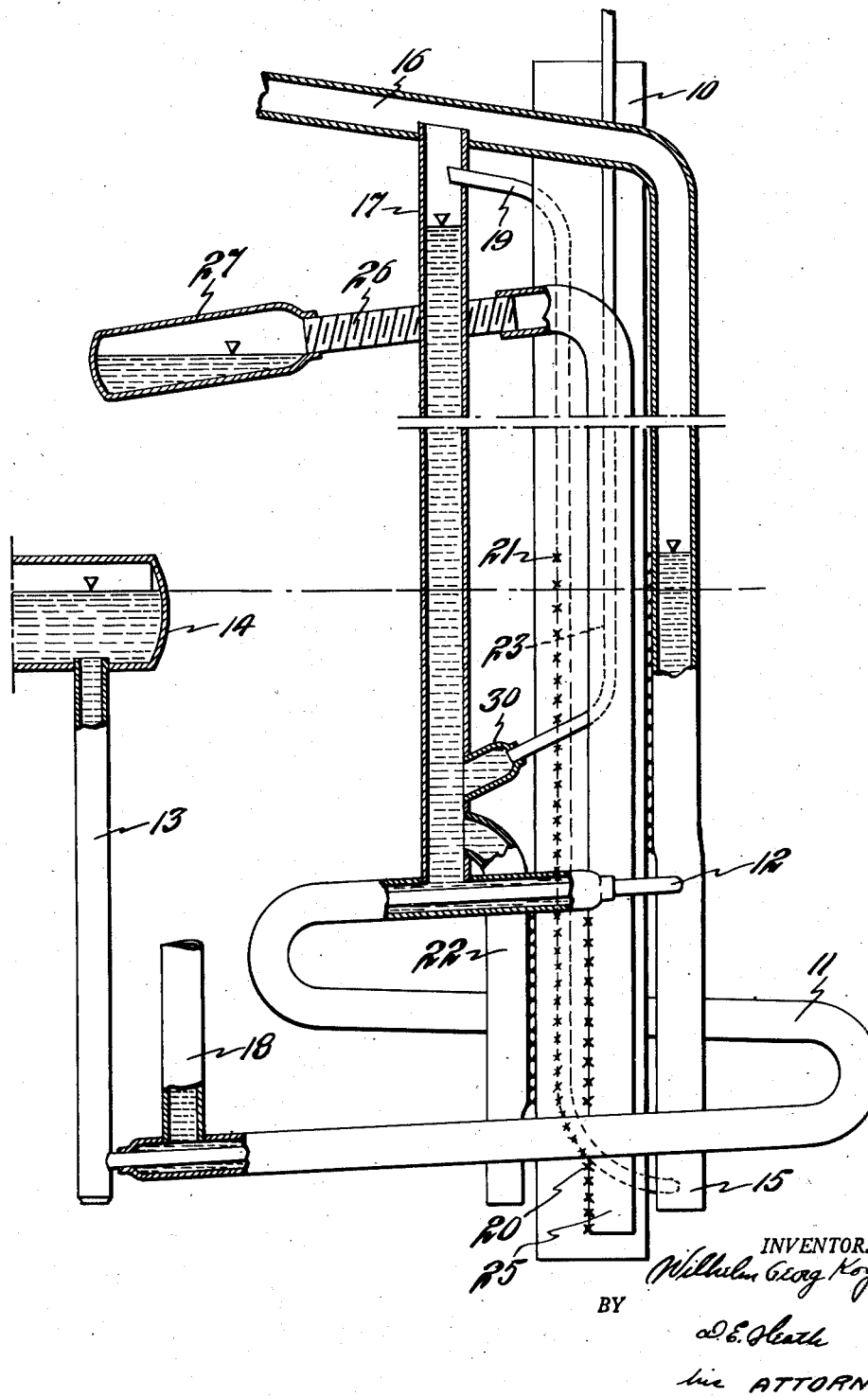

2,580,441

UNITED STATES PATENT OFFICE 2,580,441

ABSORPTION REFRIGERATION

Wilhelm Georg Kögel, Stockholm, Sweden, assignor, by mesne assignments, to Aktiebolaget Elektrolux, Stockholm, Sweden, a corporation of Sweden Application April 6, 1946, Serial No. 660,151
In Sweden April 17, 1945

7 Claims. (Cl. 62—119.5)

The invention relates to absorption refrigerating apparatus of the continuous inert gas type having a boiler constituting a heat receiving part which is formed of two conduits containing bodies of absorption solution having different concentration of refrigerant due to the manner in which heating of the boiler is effected by a heating flue having a heat input section at one end, the conduit containing absorption solution having the lower refrigerant concentration being arranged as a vent pipe for the liquid heat exchanger of the apparatus. The object of the invention is to provide an improvement for expelling of refrigerant vapor from solution in the conduit containing absorption solution in which the refrigerant concentration is smaller.

It has previously been proposed in apparatus provided with boilers of the above type to limit the heat conductive path from the heating flue to the boiler, along a longitudinal section of the flue adjacent the heat input section, in such a manner that the main part of the heat is supplied from such flue section to a liquid circulating pump associated with the boiler and in which liquid is raised by vapor-liquid lift action. It has also been proposed to utilize such liquid circulating pump to circulate liquid through the conduits of the boiler in a direction from the lower part of the conduit which holds the body of absorption solution rich in refrigerant to the upper part of the second conduit which serves as the vent pipe for the liquid heat exchanger. In instances where the liquid heat exchanger is in the form of a coil disposed about the heating flue and arranged to provide ascending paths for flow of fluid, the lower end of the second conduit or vent pipe is connected to the heat exchanger at a region approximately at the same elevation as its upper end. In such earlier proposals it was contemplated to operate the liquid circulating pump with relatively rich solution because, when the refrigerant concentration of the solution being pumped becomes too low, the efficiency of the pump is impaired. Despite the fact that intensive expulsion of refrigerant vapor from absorption solution is effected in the pump, the refrigerant concentration of the solution which is raised usually is not as low as desired for the proper operation of the refrigerating apparatus and hence additional heating of such absorption solution has been found desirable. According to this invention such additional heating is accomplished by heat conductively connecting the conduit containing absorption solution having the lower refrigerant concentration with a zone or section of the heating flue extending between the connection of such conduit to the heat exchanger and the heat input end of the heating flue.

The invention will be more fully described with reference to the accompanying drawing diagrammatically illustrating a single embodiment from which characteristic features of the invention will be seen.

The invention advantageously solves several control problems which, especially for the type of refrigerating apparatus under consideration, have been always present. Among these problems the controlling of the temperature in the evaporator of the apparatus and defrosting of same might be considered most prominent. Accordingly, the single embodiment of the invention illustrates a boiler or vapor expulsion unit of absorption refrigerating apparatus including provisions for pumping or raising absorption solution at will from the boiler to the evaporator to effect rapid defrosting.

In the drawing only those parts of the absorption refrigerating apparatus of the inert gas type are diagrammatically shown which are of immediate interest in connection with the present invention. Further, the single embodiment illustrated includes an absorption solution pump to effect defrosting of the evaporator which is connected to the boiler of the apparatus. The apparatus is adapted to operate with hydrogen gas as inert gas, water as absorbent and ammonia as refrigerant.

In the drawing reference numeral 10 denotes a tube serving as a heating flue having a lower heat input section adapted to be heated by a heat source, not shown. Concentrically disposed about the flue is a liquid heat exchanger 11 of the apparatus which is in the form of a coil having an essentially constant pitch. The inner pipe 12 of the exchanger at one end is connected by a conduit 13 to an absorber vessel 14 which contains absorption solution rich in refrigerant. At its opposite end the pipe 12 is connected to a vertically disposed conduit 15 which is closed at the bottom. The conduit 15 is heat-conductively connected, such as, for example, by welding, to the flue 10 along a common generatrix. The upper extension of the conduit 15 forms a vapour conduit 16 communicating with a condenser of the apparatus, not shown. The conduit 15 forms the main boiler of the vapor expulsion unit in which the principal part of the refrigerant vapours are expelled from solution. The rich solution flows from the absorber vessel 14 through the heat exchanger 11 into the conduit 15 in which it is heated to the boiling temperature, and with decreasing refrigerant concentration, flows downwardly to the bottom of the conduit 15. A liquid circulation pump 19 at its lower end is connected to the bottom part of the conduit 15 and at its upper end communicates with a stand pipe 17 which is essentially vertically disposed and at the top opens into the vapour conduit 16. The lower end of the stand pipe 17 opens into the outer pipe of the liquid heat exchanger 11 through which the solution pumped from pipe 17 flows into a conduit 18 which is connected at its upper end to an air-cooled absorber, not shown, suitably formed of a pipe coil. The pump 19 comprises a pipe which, from a point 20 up to a point 21 approximately level with the absorption solution level in the absorber vessel 14, is welded to the heating flue 10 along a common generatrix.

In order to effect an increase in heat supply to the pump pipe 19 and to avoid such expulsion of refrigerant vapor in the bottom portion of the conduit 15 whereby the refrigerant concentration of the solution will be so poor as to impair the efficiency of the pump, the lower part of the conduit 15 is spaced from and thermally separated from the flue. Despite expulsion of refrigerant vapor in the pump 19 the raised solution will in certain cases have an undesirably high concentration of refrigerant, and consequently further expulsion of refrigerant vapor from solution in the pipe 17 desirably should be effected. It has previously been proposed to thermally connect the stand pipe 17 to the heating flue along a generatrix common therewith, and in this way provide heat for expelling refrigerant vapor from the solution. Due to the fact that heat from the heat source is applied to the section of the heating flue 10 adjacent the lower open end thereof, heating of solution in the standpipe 17 in the manner just explained would be effected at an insufficiently high temperature for effectively expelling refrigerant vapor from solution which is already relatively weak in refrigerant.

According to this invention a pocket-shaped vessel 22 is connected to the lower part of the pipe 17, and thermally connected to the heating flue 10 along a generatrix common therewith at a section or zone of the flue at which the heat supply from the heat source is concentrated. Intense expulsion of vapors takes place in the pocket 22 which are rich in absorbent vapor. Such vapors pass out of the pocket 22 into the standpipe 17 in which condensation of absorption liquid vapors occurs due to the lower temperature of the solution therein. The heat of condensation thus liberated becomes effective to heat solution in standpipe 17 and causes expulsion of refrigerant vapor from such solution. In this manner the solution raised into standpipe 17 will be deprived of refrigerant and a desired low concentration obtained to insure efficient operation of the absorber to which such poor solution is conducted for the absorption step in the refrigerating cycle.

As mentioned above, the pocket-shaped vessel 22 is thermally connected to the flue tube 10 along a common generatrix, whereby unsymmetric heating of the liquid in the vessel 22 will be effected. Due to such heating upward flow of liquid will take place along the heated side of the vessel 22 and a corresponding downward flow of liquid occurs at the opposite side of the vessel which is at a somewhat lower temperature. In this way a continuous renewal of liquid in the vessel 22 will be obtained, whereby excessive expulsion of the refrigerant vapor will be avoided. It may also be desirable in certain instances to separate the lower part of the pocket or vessel 22 thermally from the flue, as shown in the drawing.

The invention also advantageously solves a problem which often has been present, namely, temperature control in the evaporator and defrosting thereof. In the drawing 23 denotes a pipe having essentially the same inner diameter as the liquid circulating pump 19 of the refrigerating apparatus. The lower end of the pipe 23 is connected to the lower part of the pipe 17 just above the connecting point of pocket or vessel 22. The bell-like upwardly directed extension 30 of the lower end of the pipe 23 is provided to trap or catch some vapor or gas bubbles flowing upwardly in the boiler pipe 17. The upper end of the pipe 23 may be connected to the pressure equalizing vessel of the refrigerating apparatus, not shown, or possibly directly to the evaporator, also not shown. The pipe 23 for a part of its length, in a manner known per se, is centrally disposed within a larger pipe 25 which is closed at its lower end and thermally connected to the flue tube 10 along a common generatrix up to a point at a level with the uppermost part of the liquid heat exchanger 11. The upper end of the pipe 25 is in a manner known per se connected to a flexible conduit 26 which in turn is connected to a container 27, containing a certain amount of a suitable heat transfer medium. The system 27, 26, 25 forms a hermetically closed heat transfer member.

bato lover

When the apparatus is being operated refrigerant vapours are, as previously mentioned, developed in the pocket 22 of which a small part is caught in the enlarged or bell-shaped part 30 and gradually forms a large vapour bubble, which continually increases and gradually ascends the pump pipe 23, where the pumping is thus started. During normal operation of the apparatus the vapour bubbles for the most part condense to liquid during their passage upwardly in the liquid column located in the pump pipe 23, and the refrigerant concentration in this column is generally increased. In this manner the pump 23 is always made ready and prepared for operation. When heat in a well known manner is supplied to the liquid column maintained in the pump pipe 23 by tilting and pouring the heat transfer medium from the container 27, which has condensed to liquid therein, into the warm pipe 25, immediate vapourization of liquid in the pipe 23 is obtained and the liquid therein is pumped up through the pressure equalizing vessel of the apparatus to the evaporator where the desired increase of temperature is effected. Slowly the heat transfer medium tilted into the pipe 25 is vapourized and the vapors are condensed in the container 27, whereafter only an atmosphere of superheated vapour occupies and takes up the space in the pipe 25. The pumping in the pipe 23 will then cease because, in spite of heat being continuously supplied to such atmosphere from the bottom of the pipe 25, the heat transfer to the pipe 23 will be so small that no pumping of liquid can be maintained therein. When required it is thus possible by bending the flexible pipe 26 upwardly to tilt the heat transfer medium into the pipe 25, where it is evaporized and again starts the pumping.

The invention is not to be limited to the embodiment diagrammatically shown and described above, but can be varied in several ways within the scope of the basic inventive principle, as set forth in the following claims.

I claim:

1. In an absorption refrigerating system of the inert gas type including a refrigerant vapor supply line, an upright heating flue, a circuit for absorption solution including an absorber and a vapor expulsion unit comprising first and second conduits and a vapor lift tube, said first conduit being thermally connected to said flue and connected to receive absorption solution from said absorber, said vapor lift tube having a heat receiving and vapor forming part heat conductively connected to said flue and connected in said circuit to receive solution from said first conduit and deliver solution to a first upper portion of said second conduit, a connection for conducting solution from said second conduit to said absorber, means including said flue for supplying heat to a lower second portion of said second conduit at a temperature level substantially as high as that at which heat is supplied to said lift tube part, and said second conduit having the upper first portion thereof spaced from and out of thermal contact with said upright flue and being constructed and arranged so that vapor formed in the lower second portion thereof passes to the upper first portion thereof in intimate contact with solution to produce an internally heated zone, the upper end of the first portion of said second conduit being in communication with said vapor supply line for conducting vapor from said internally heated zone.

2. In an absorption refrigerating system of the inert gas type including a refrigerant vapor supply line, an upright heating flue having a lower heat input end, a circuit for absorption solution including an absorber, a vertically extending liquid heat exchanger and a vapor expulsion unit which is in communication with the vapor supply line and comprises first and second conduits and a vapor lift tube, said first conduit being thermally connected to said flue, a connection including said heat exchanger for conducting solution entirely by gravity flow from said absorber to said first conduit, said vapor lift tube having a heat receiving and vapor forming part thermally connected to a zone of said flue adjacent the lower heat input end and connected to receive solution from said first conduit and deliver solution to the upper part of said second conduit, a connection including said heat exchanger for conducting solution to said absorber from said second conduit at a region intermediate the ends thereof, and the portion of said second conduit above said region being spaced from and out of thermal contact with said flue and the portion thereof below said region being in thermal contact with the zone of said flue adjacent the lower heat input end and in the vertical range of said heat exchanger.

3. In an absorption refrigerating system of the inert gas type including a refrigerant vapor supply line, an upright heating flue having a lower heat input end, a circuit for absorption solution including an absorber, a vertically extending liquid heat exchanger and a vapor expulsion unit which is in communication with the vapor supply line and comprises a generator vessel, a standpipe and a first vapor lift tube having the lower and upper ends thereof communicating with said vessel and standpipe, respectively, for raising solution therethrough, said vapor expulsion unit being associated with said flue and so constructed and arranged that, due to heat derived from said flue, said first lift tube promotes circulation of solution in said circuit and the concentration of refrigerant in solution in said generator vessel is greater than that in said standpipe, a connection including a passage of said liquid heat exchanger for conducting solution from said standpipe to said absorber, a vessel forming a closed pocket for solution having the upper end thereof communicating with said standpipe, said last-mentioned vessel being heat conductively connected to said flue along a section thereof which is between the region from which solution passes from said standpipe into said connection and the lower heat input end of said flue and in the vertical range of said liquid heat exchanger, and a second vapor lift tube for raising solution to a point in the system above the absorption solution circuit, said second vapor lift tube being in such communication with the vessel forming said closed pocket that vapor bubbles formed and rising in the latter will pass into the lower end of said second vapor lift tube to effect heating of liquid therein.

4. In an absorption refrigerating system of the inert gas type including a refrigerant vapor supply line, a heating flue having a lower heat input end, a circuit for absorption solution including a vapor expulsion unit communicating with the vapor supply line which comprises first and second conduits and a vapor lift tube having the lower and upper ends thereof communicating with the first and second conduits, respectively, for raising solution therethrough, said vapor expulsion unit being so constructed and arranged that, due to heat derived from said flue, said lift tube promotes circulation of solution in said circuit and the concentration of refrigerant in solution in said first conduit is greater than that in said second conduit, said circuit including a connection for conducting solution entirely by gravity flow from said absorber to said first conduit and a connection for conducting solution to said absorber from a region of said second conduit intermediate the ends thereof, said second conduit being thermally connected to said flue along a section thereof extending downwardly from said region and disposed between such region and the lower heat input end of said flue, and pump means including piping communicating with said second conduit which is operable to raise absorption solution from the latter to a point in the system above said absorption solution circuit, said piping and section of said second conduit thermally connected to said flue being formed and arranged so that vapor bubbles formed in such section will flow into said piping to effect heating of solution in said piping.

5. A system as set forth in claim 4 in which said pump means comprises heat operated structure for raising absorption solution by vapor lift action.

6. A system as set forth in claim 4 in which said pump means comprises structure operable to raise absorption solution by vapor lift action by heat derived from said heating flue.

7. A system as set forth in claim 4 in which said piping comprises a vapor lift tube having an enlarged lower end communicating with said second conduit which is formed and arranged to catch vapor bubbles rising in said second conduit.

WILHELM GEORG KÖGEL.

REFERENCES CITED

The following references are of record in the file of this patent:

UNITED STATES PATENTS

| Number | Name | Date |
| --- | --- | --- |
| 2,363,771 | Bergholm | Nov. 28, 1944 |
| 2,402,414 | Kögel | June 18, 1946 |